US012736221B2

(12) United States Patent
Zhao et al.

(10) Patent No.: US 12,736,221 B2
(45) Date of Patent: Sep. 15, 2026

(54) SELECTIVE CATALYTIC REDUCTION CATALYST MODULE SUPPORT SYSTEM AND INSTALLATION METHOD

(71) Applicant: Lummus Technology LLC, Bloomfield, NJ (US)

(72) Inventors: Baozhong Zhao, Livingston, NJ (US); Eduardo Hart, Hewitt, NJ (US); Xueping Li, Somers, NY (US); Alejandro S Carrillo, New York, NY (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 534 days.

(21) Appl. No.: 18/463,064

(22) Filed: Sep. 7, 2023

(65) Prior Publication Data

US 2024/0093867 A1 Mar. 21, 2024

Related U.S. Application Data

(60) Provisional application No. 63/404,883, filed on Sep. 8, 2022.

(51) Int. Cl.

| | |
|---|---|
| ***F23J 15/00*** | (2006.01) |
| ***B01D 53/86*** | (2006.01) |
| ***F23J 15/02*** | (2006.01) |

(52) U.S. Cl.

CPC ........ *F23J 15/006* (2013.01); *B01D 53/8631* (2013.01); *F23J 15/02* (2013.01); *B01D 2257/404* (2013.01); *F23J 2219/10* (2013.01)

(58) Field of Classification Search

CPC ........ F23J 15/006; F23J 15/02; F23J 2219/10; F23J 15/08; B01D 53/8631;

(Continued)

(56) References Cited

U.S. PATENT DOCUMENTS 5,112,578 A * 5/1992 Murayama ............... B01J 8/062 422/658
7,399,458 B1 7/2008 Martin et al.

(Continued)

FOREIGN PATENT DOCUMENTS

CA 2439866 A1 3/2004
CN 210 905 682 U 7/2020

(Continued)

*Primary Examiner* — David J Laux

(74) *Attorney, Agent, or Firm* — Seed Intellectual Property Law Group LLP

(57) ABSTRACT

A heater includes a convection section with columns and tube sheets coupled to the columns with tubes received in the tube sheets. The convection section includes a space between the tube sheets associated with corresponding pairs of columns. A structural frame is coupled to the columns and positioned in the space to slidably receive one or more catalyst support beds for loading or unloading a catalyst into the convection section through a lateral side of the convection section of the heater. The structural frame may include beams, struts, slide plates, and other frame elements that assist with supporting the catalyst support beds and enable sliding of the catalyst support beds with respect to the structural frame.

22 Claims, 10 Drawing Sheets

(58) Field of Classification Search
CPC .............. B01D 2257/404; B01D 53/88; B01D 2258/0283; B01J 2208/00884; B01J 19/305; B01J 8/0285; B01J 8/0292; B01J 15/005
See application file for complete search history.

(56) References Cited

U.S. PATENT DOCUMENTS

| | | | | |
|---|---|---|---|---|
| 7,500,437 | B2 | 3/2009 | Lefebvre et al. | |
| 7,651,968 | B2 * | 1/2010 | Bosch | B01J 35/36 502/64 |
| 9,314,739 | B2 | 4/2016 | Lisberger | |
| 2009/0005600 | A1 * | 1/2009 | Bosch | B01J 29/18 502/158 |
| 2009/0025655 | A1 * | 1/2009 | Tanaka | F23N 5/006 122/14.21 |
| 2012/0222591 | A1 | 9/2012 | Greenhut et al. | |
| 2014/0050626 | A1 | 2/2014 | Heidenreich | |
| 2016/0348558 | A1 | 12/2016 | Garduno et al. | |

FOREIGN PATENT DOCUMENTS

| | | | |
|---|---|---|---|
| CN | 217 139 950 | U | 8/2022 |
| DE | 37 13 683 | A1 | 11/1988 |
| WO | WO 2010132563 | A2 | 11/2010 |
| WO | WO 2014116929 | A1 | 7/2014 |

* cited by examiner 102
112
104
114
117
116
100S
118

104
118
132
136A
136B
166
162
164
138
160
146
116
100S
124

SELECTIVE CATALYTIC REDUCTION CATALYST MODULE SUPPORT SYSTEM AND INSTALLATION METHOD

BACKGROUND

Technical Field

The present disclosure is generally directed to selective catalytic reduction, and more particularly, but not exclusively, to selective catalytic reduction systems and methods for fired heaters.

Description of the Related Art

Selective catalytic reduction ("SCR") of Nitrous Oxide (NOx) is known to reduce NOx emissions. SCR technology has been applied to a number of industries to meet more stringent emissions standards that have been introduced in an effort to combat pollution and climate change. One such industry is the petrochemical processing industry, which typically employs large fired heaters, among a variety of other process equipment, to produce petrochemicals from byproducts of the crude oil refining process and other feedstock. The operation of fired heaters for petrochemical processing can produce a number of emissions, including NOx.

At a high level, SCR of NOx in a fired heater is carried out by using SCR catalyst modules and controlled ammonia injection within the flue gas temperature window. The SCR reactor is equipped with a catalyst bed for carrying large blocks of catalyst. Some processing systems are built new with conventional SCR technology. However, such conventional SCR designs have a number of deficiencies. For example, known SCR systems and methods for fired heaters occupy a significant amount of space in the processing system, have complicated supporting structures, and there is limited access to the space and structures for loading and unloading the catalyst modules.

It is also known to retrofit older systems with SCR technology to reduce NOx emissions when new, stricter emissions standards for NOx come into effect. The above disadvantages of known SCR technology are particularly acute for retrofitting existing systems where space is more limited, and the existing system does not have supporting structures for an SCR improvement. As a result, retrofitting is an expensive process that can include significant system downtime, among other disadvantages.

The prior art has failed to address the above challenges with known SCR technology. For example, U.S. Pat. No. 7,399,458 to Martin et al. ("Martin") appears to describe a fired equipment system and a process for operating the same that combines stationary industrial burner technology and a catalyst bed that converts pollutants formed during combustion of fuel and air in the burner to yield stack gases that can be discharged to the atmosphere. At a high level, the systems and methods of Martin are mainly related to using a catalyst bed within a fired equipment system. However, such an arrangement does not address NOx emissions contained in flue gas streams in existing fired heaters. Further, the SCR technology in Martin is directly installed as part of the burner system and therefore has limited applicability to fired heaters generally, including with respect to retrofitting existing systems.

U.S. Pat. No. 7,500,437 to Lefebvre et al. ("Lefebvre") appears to describe methods and systems for controlling SCR performance in fossil fuel boilers by developing profiles of one or more conditions affecting SCR performance. For example, a controller receives a performance goal for the boiler, data values corresponding to boiler control variables, and data regarding boiler performance variables. These data inputs are then used to develop a desired boiler performance model. As a result, Lefebvre appears to be directed to modeling and optimization of operating parameters for fossil fuel boilers, which fails to address the deficiencies of known SCR technology above.

U.S. Pat. No. 9,314,739 to Lisberger appears to describe a process and an apparatus to denox flue gases containing carbon monoxide and/or gaseous organic substances with at least one catalyst for catalytic reduction of NOx and a heat exchanger for heating the flue gases from recovery of the residual heat of the denoxed flue gases before the catalytic reduction to a reaction temperature of 160° C. to 500° C. For the best possible denoxing of the flue gases with simultaneous minimization of the externally supplied energy needed, it is envisaged in Lisberger that the losses associated with the heat movement in the heat exchanger will be compensated for by providing at least one stage for regenerative post combustion of the carbon monoxide and/or of the gaseous organic substances. As a result, Lisberger appears to be directed to reducing NOx emissions with regenerative post combustion following an SCR stage, but fails to address the challenges of known SCR systems and methods.

WIPO Published Application No. WO 2014/116929 to Novak et al. ("Novak") appears to describe the reduction of NOx emissions from fired heaters with combustion air preheaters and by using high emissivity coatings. In sum, Novak appears to be directed to combining the air preheat and high emissivity coatings to increase the radiant efficiency and then lower the total firing and the total amount of NOx emission. As a result, Novak appears to be unrelated to SCR technology generally.

WIPO Published Application No. WO 2010/132563 to Pfeffer et al. ("Pfeffer") appears to describe a multi-step system to remove NOx from combustion flue gas via SCR or selective non-catalytic reduction with ammonia or an ammonia forming compound, followed by treatment with hydrogen peroxide to remove residual ammonia and, optionally, treatment with an alkali reagent to reduce residual NOx in the flue gas stream. The NOx-depleted flue gas stream may also be subjected to a desulfurization treatment for removal of SOx. However, Pfeffer likewise fails to address the challenges with known SCR technology raised above.

Canadian Patent No. 2,439,866 to Mcnertney et al. ("Mcnertney") appears to describe a passive system for recovering energy and nitrogen oxides from flue gas produced by a boiler that employs a particular arrangement of economizer surfaces to ensure the temperature of the flue gas entering a SCR reactor is maintained within a required range over a wide range of boiler loads. Such an application of SCR technology to a boiler with varying load and shifting temperature range entering the SCR catalyst bed is different from SCR technology in stable operations of fired heaters or cracking heaters. Moreover, Mcnertney fails to address the challenges of known SCR technology raised above.

U.S. Patent Publication No. 2012/0222591 to Greenhut et al. ("Greenhut") appears to describe a method of selective catalytic NOx reduction in a power boiler and a power boiler with selective catalytic NOx reduction. Fuel is combusted in a furnace of the boiler and a flue gas stream that includes NOx is generated. The flue gas stream is conducted from the furnace along a flue gas channel to a stack. The flue gas stream is cooled in a heat recovery area, including an economizer section, arranged in the flue gas channel. At least a portion of the NOx is reduced to N2 in an NOx catalyst arranged in the flue gas channel downstream of the economizer section. The flue gas is further cooled and heated air is generated in a gas-to-air heater arranged in the flue gas channel downstream of the economizer section and upstream of the NOx catalyst. Similar to other examples from the prior art above, Greenhut is directed to SCR technology for boilers, and specifically for a power boiler, that fails to appreciate the challenges associated with SCR technology for fired heaters.

As a result, it would be advantageous to have SCR systems and methods that overcome the deficiencies and disadvantages of known SCR technology.

BRIEF SUMMARY

The concepts of the present disclosure are generally directed to installation of SCR catalyst modules in a convection section of a fired heater, such as a steam cracker, where a suitable flue gas temperature window for SCR of NOx is located. The concepts of the disclosure can be implemented in a number of forms, and in other industries outside petrochemical processing. Among other benefits, the concepts of the disclosure enable catalyst support structures that are an integral part of the convection section of the fired heater, instead of utilizing a separate and distinct structure for SCR of NOx with catalyst modules as in known SCR systems, to reduce plot space and equipment count. Further, the catalyst support grids structures are designed with catalyst modules installed in the cavities instead of being located above the supporting structure as in known systems. The concepts of the disclosure also enable self-sealing of the catalyst support structures and installed catalyst modules to eliminate sealing tape that is commonly used when catalyst modules are placed on top of support structures. Moreover, the concepts of the disclosure enable loading and unloading of SCR catalyst modules on lateral sides of the convection section along the entire convection length to achieve target NOx reduction as opposed to loading or unloading of the catalyst modules through ends of the convection section as in prior practice.

For fired heaters that were designed and built when NOx emission standard was not as stringent, the space and structural support for SCR catalyst modules was not considered. As a result, those fired heaters were not designed or equipped with large vertical spaces, access doors, and structural supports for loading and unloading the SCR catalyst modules. For example, in an existing ethylene cracking heater design, the convection section is typically designed with multiple coil banks for preheating the process streams and boiler feed water and steam. The vertical spacing between two coil banks may be about 460 mm measured between the centerlines of two adjacent tube rows. This space was originally intended to allow for the installation of lancing doors for performing regular maintenance or provide mechanical clearance, among others. The concepts of the disclosure enable such an existing heater, and others, to be retrofitted with SCR technology to reduce NOx emissions by utilizing a structural frame system to support the SCR catalyst modules, enable loading and unloading the SCR catalyst modules, and to create suitable seals for directing all flue gas flow through the catalyst. As a result, loading and unloading of the SCR catalyst modules can be accomplished through lateral sides of the convection section instead of through ends of the convection section along an entire length of the convection section in a space with a height of 460 mm or less in some non-limiting examples. Additional benefits and advantages are described elsewhere herein.

In some non-limiting examples, a fired heater includes a convection with a plurality of columns or other supports arranged in pairs with the pairs spaced from each other a longitudinal or length direction of the convection section. The pairs of columns include a first column and a second column spaced from each other in a lateral or width direction of the convection section. Tube sheets are coupled to the columns, with pairs of tube sheets coupled to corresponding pairs of columns. The pairs of tube sheets include a first tube sheet and a second tube sheet stacked in an axial or height direction of the convection section along the corresponding columns. A plurality of tube bundles are coupled to the plurality of tube sheets. The convection section includes a gap or space between the first tube sheet and second tube sheet in each pair of tube sheets in the axial or height direction of the convection section.

A structural frame is positioned in the gap to support a first catalyst support bed with the first catalyst support bed being slidable with respect to the columns to enable loading or unloading of a catalyst into the convection section through at least one lateral side of the convection section. In more detail, the structural frame includes a plurality of beams coupled to the plurality of columns and extending through the gap in the lateral direction of the convection section, with each of the plurality of beams including a first flange with a rail and a second flange with a guide element. A first catalyst support bed includes a plurality of struts coupled together with catalyst modules received in one or more cavities defined by the struts. At least one of the plurality of struts includes a channel interfacing with the rail of the first flange of corresponding ones of the plurality of beams to enable sliding of the first catalyst support bed relative to the plurality of beams. The structural frame also includes support bars disposed on the second flange of the corresponding ones of the plurality of beams that include a slot configured to interface with the guide element of the second flange of the corresponding ones of the plurality of beams to assist with sliding of the first catalyst support bed.

The at least one lateral side of the convection side may be a first lateral side of the convection section. The structural frame may further include a second catalyst support bed with similar features to the first catalyst support bed to enable loading or unloading of catalyst on the second catalyst support bed through a second lateral side of the convection section opposite to the first side. The structural frame may further include an access door frame coupled to the columns and one or more removable access doors coupled to the access door frame. Further, the convection section includes gaskets between the support bars and the plurality of beams, and between the plurality of beams and corresponding ones of the tube sheets, as well as a seal plate between the first and second catalyst support beds to enable self-sealing that directs all flue gas flow through the catalyst modules. An insulation layer or insulation blocks may be provided between the access doors and the catalyst support beds in some examples. Other features of embodiments of the disclosure will be described elsewhere.

BRIEF DESCRIPTION OF THE SEVERAL VIEWS OF THE DRAWINGS

The present disclosure will be more fully understood by reference to the following figures, which are for illustrative purposes only. In the drawings, like labels refer to like parts throughout, except as otherwise specified. The figures do not describe every aspect of the teachings disclosed herein and do not limit the scope of the claims.

DETAILED DESCRIPTION

Figure 1:
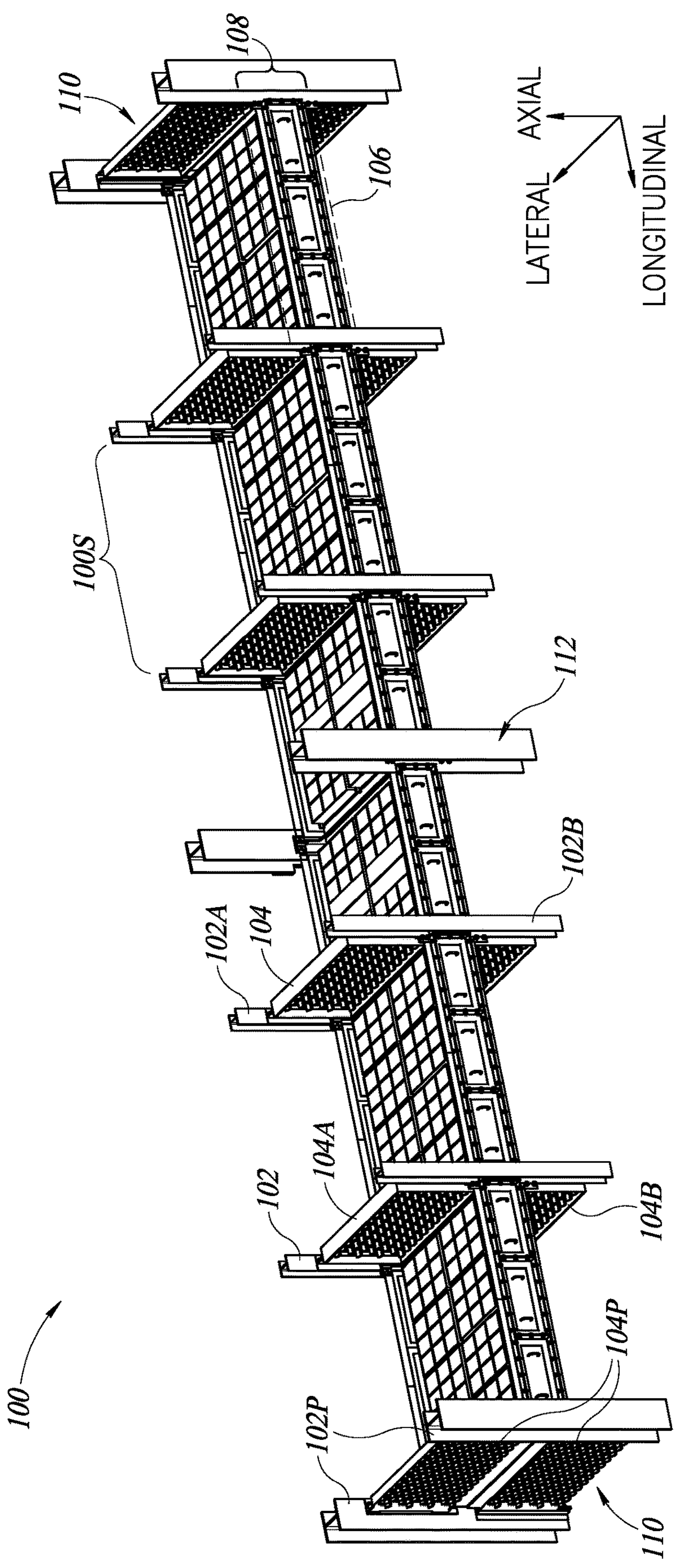
FIG. 1 is an isometric view of an embodiment of a convection section of a fired heater according to the present disclosure.

Persons of ordinary skill in the relevant art will understand that the present disclosure is illustrative only and not in any way limiting. Other embodiments of the presently disclosed systems and methods readily suggest themselves to such skilled persons having the assistance of this disclosure.

Each of the features and teachings disclosed herein can be utilized separately or in conjunction with other features and teachings to provide SCR devices, systems, and methods. Representative examples utilizing many of these additional features and teachings, both separately and in combination, are described in further detail with reference to the attached Figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components.

As will be described in greater detail below, the concepts of the disclosure are generally directed to SCR technology provided in a form factor of a structural frame that may be self-supported and attached to existing columns of a convection section of a heater. Such an arrangement may allow for thermal expansion movement both vertically and horizontally, while also providing access to the catalyst blocks through lateral sides of the convection section for loading and unloading the SCR catalyst modules.

The concepts of the disclosure are particularly useful for reducing NOx emissions from existing fired heaters, including but not limited to existing steam crackers without, significant structural modifications. In other words, the concepts of the disclosure are advantageous for retrofitting existing process technology, and provide a lower cost method of installing SCR catalyst modules to reduce NOx emission in existing facilities. The technology can also be installed as a new design option to provide partial NOx emission reduction at a lower cost without a major structural installation for the catalyst modules as in current systems.

In some non-limiting examples, methods are disclosed for increasing radiant efficiency of an existing furnace, in particular, but not exclusively, a steam cracking furnace for producing bulk chemicals, such as ethylene, propylene, butadiene, and others whereby the air, fuel, or both are preheated using energy recovered from the flue gas. Such a preheated air and/or fuel mixture will result in higher NOx in the flue gas, and the concepts of the disclosure assist with reducing such NOx emissions.

While the present disclosure will proceed to describe certain examples of the technology applied to a convection section of a steam cracker that may be particularly advantageous for petrochemical processing and refining, it will be appreciated that the concepts of the disclosure can be applied to a broad range of technologies and industries. In particular, the concepts of the disclosure can be applied equally to any industry or technology utilizing a fired heater, such as at least in the offshore, refinery, power, petrochemical, or paper and food industries, among others. Further, the concepts of the disclosure can be applied to technologies and industries where it is advantageous to reduce NOx emissions generally. Thus, the concepts of the disclosure are not limited to the examples provided below.

FIG. 1 shows one or more embodiments of a convection section 100 of a fired heater according to the present disclosure. The convection section 100 is illustrated without additional components of the fired heater, such as at least a shell, for clarity with respect to the concepts of the disclosure. The convection section 100 is arranged in FIG. 1 with a length (i.e., largest dimension) of the convection section 100 extending in a longitudinal direction, a width (i.e., into and out of the page) extending in a lateral direction, and a height (i.e., from a bottom to a top according to the ordinary meaning of those terms) in an axial direction. Except as otherwise provided herein, the directional indicators "longitudinal," "lateral," and "axial" only provide a frame of reference for explaining the concepts of the disclosure, and do not limit the disclosure to specific configurations. For example, while the convection section 100 is arranged generally horizontally with the length direction extending in the longitudinal direction in FIG. 1, the convection section 100 may also be arranged vertically with the length extending in the axial direction in some embodiments.

The convection section 100 may be approximately 15 meters long by 3 meters wide, among other possibilities, and include a support system that includes a plurality of columns 102 (which may also be referred to herein as supports 102), a plurality of tube sheets 104 coupled to the plurality of columns 102, and a plurality of tubes or tube bundles coupled to the plurality of tube sheets 104. In embodiments of the disclosure where a convection section is retrofitted with SCR technology according to the concepts herein, the support system, including the columns 102, tube sheets 104, and tubes 106 may be part of the existing heater structure. Alternatively, such support system can be built as part of a new system installation. The plurality of columns 102 are arranged in pairs of columns 102P with the pairs of columns 102P spaced from each other along the longitudinal direction of the convection section. The pairs of columns 102P each include a first column 102A and a second column 102B with the first column 102A spaced from the second column 102B in the lateral direction in each pair of columns 102P.

The plurality of tube sheets 104 are coupled to the plurality of columns 102, and include pairs of tube sheets 104P coupled to corresponding pairs of columns 102P. In an embodiment, the pairs of tube sheets 104P are arranged in the axial direction along the pairs of columns 102P with each pair of tube sheets 104P including a first tube sheet 104A and a second tube sheet 104B. The first tube sheet 104A may be an upper tube sheet 104A while the second tube sheet 104B may be a lower tube sheet 104B, or vice versa, in each pair of tube sheets 104P. Thus, the first tube sheet 104A may be located above the second tube sheet 104B in the axial direction in some non-limiting examples. The plurality of tubes 106 may be arranged in bundles that are coupled to the plurality of tube sheets 104. FIG. 1 illustrates only one tube 106 coupled to one of the first tube sheets 104A and one of the second tube sheets 104B with the tube 106 illustrated schematically as dashed lines to avoid obscuring features of the disclosure, but it is to be appreciated that the tubes 106 may include a significantly greater number of tubes 106 or tube bundles 106 than those illustrated in FIG. 1, with the tubes 106 generally extending along all of, or least a majority of, the length or longitudinal direction of the convection section 100 with support provided by the tube sheets 104. Further, the tube sheets 104 may instead be tube supports in some embodiments.

The above arrangement of the tube sheets 104 and tubes 106 in the support system of the convection section 100 creates a space or gap 108 in the axial direction between the tubes 106. The gap 108 between the tubes 106 may be larger than the space between the outer frames of the tube sheets 104 to enable installation of larger catalyst modules and improve SCR performance and NOx reduction, while also utilizing a maximum amount of available space. The gap 108 is occupied by a structural frame for SCR modules in FIG. 1 that are described further elsewhere, with the gap 108 and additional tubes 106 shown more clearly in FIG. 5. In some embodiments, the vertical or axial distance between two tube bundles above and below the gap 108 is about 460 mm measured between centerlines of tube rows adjacent to the gap 108, such as those illustrated in FIG. 5. As such, the gap 108 may be a distance of about 460 mm in the axial direction in some embodiments, or as small as approximately 300 mm or 200 mm in further non-limiting examples of a convection section with different configurations. The arrangement of the support system of the convection section 100 defines subsections 100S between pairs of columns 102P and pairs of tube sheets 104P. As shown in FIG. 1, the convection section 100 includes at least 6 subsections 100S, although the disclosure is not limited thereto. The convection section 100 also includes end faces 110 at opposite longitudinal ends of the convection section 100 such that a length of the convection section 100 may be defined as being between the end faces 110. Lateral sides 112 of the convection section 100 extend between the end faces 110, with the lateral sides 112 generally referring to a front side and a rear side in the orientation of FIG. 1, and according to the ordinary meaning of "front" and "rear."

In a typical convection section known in the art, the vertical space between the tube sheets may allow for the installation of lancing doors for performing regular maintenance or provide mechanical clearance. Further, catalyst modules for SCR technology are typically loaded and unloaded through the ends of the convection section (i.e., end faces 110) in conventional examples with a typical convection section including a single catalyst support bed that spans the entire longitudinal length of the convection section (i.e., a single bed between end faces 110). Such an arrangement inherently makes the catalyst modules more difficult to access for loading and unloading (among other options), and particularly for catalyst modules towards a center of the convection section, among other disadvantages. In addition, the space for loading and unloading of the catalyst modules at the end faces of a typical convection section limits the height or size of the catalyst modules to the space between tube sheets, which also limits the overall effectiveness of SCR for NOx reduction. The present disclosure contemplates using the gap 108, which is larger than the space between tube sheets 104, to install SCR catalyst modules to overcome the above deficiencies of the prior art regarding lack of space, structural supports, and access to the modules when building a new convection section or when retrofitting an existing convection section. As will be described in greater detail below, the concepts of the disclosure enable loading and unloading the SCR catalyst modules through the lateral sides 112 of the convection section, instead of around end faces 110 as is typical in the art, which allows larger SCR catalyst modules to be loaded and unloaded into the system and also improves the unloading or loading operations while enabling more efficient retrofitting of existing systems and maximizing available space, among other benefits described herein. In addition, the concepts of the disclosure do not rely on a single catalyst support bed for the entire longitudinal length of the convection section, but rather, utilize one or more catalyst support beds (which may also be referred to herein as "SCR modules" that carry one or more catalyst modules) in each distinct and separate subsection 100S of the convection section 100 to improve loading and unloading operations, among other benefits. In other words, the concepts of the disclosure provide an SCR module that can carry one or more catalyst modules in each of one or more subsections 100S of the convection section 100 with the subsections 100S being less than the entire longitudinal length of the convection section to provide the benefits described herein. As such, the concepts of the disclosure provide multiple independent and parallel sections that each include a respective SCR modules (or catalyst support bed) that can be installed from lateral sides of the respective section, instead of the end faces of the entire convection section. Further, the concepts of the disclosure provide for various seals that direct all flue gas flowing through catalyst blocks. As a result, the concepts of the disclosure enable loading and unloading catalyst modules through lateral sides 112 of the convection section 100, and in spaces, such as gap 108, that are considerably smaller than conventional SCR technology, such as spaces or gaps with a height of 460 mm height or less in some embodiments. These concepts may be implemented via embodiments of a structural frame that is coupled to the plurality of columns 102, as described in further detail below.

Figure 2:
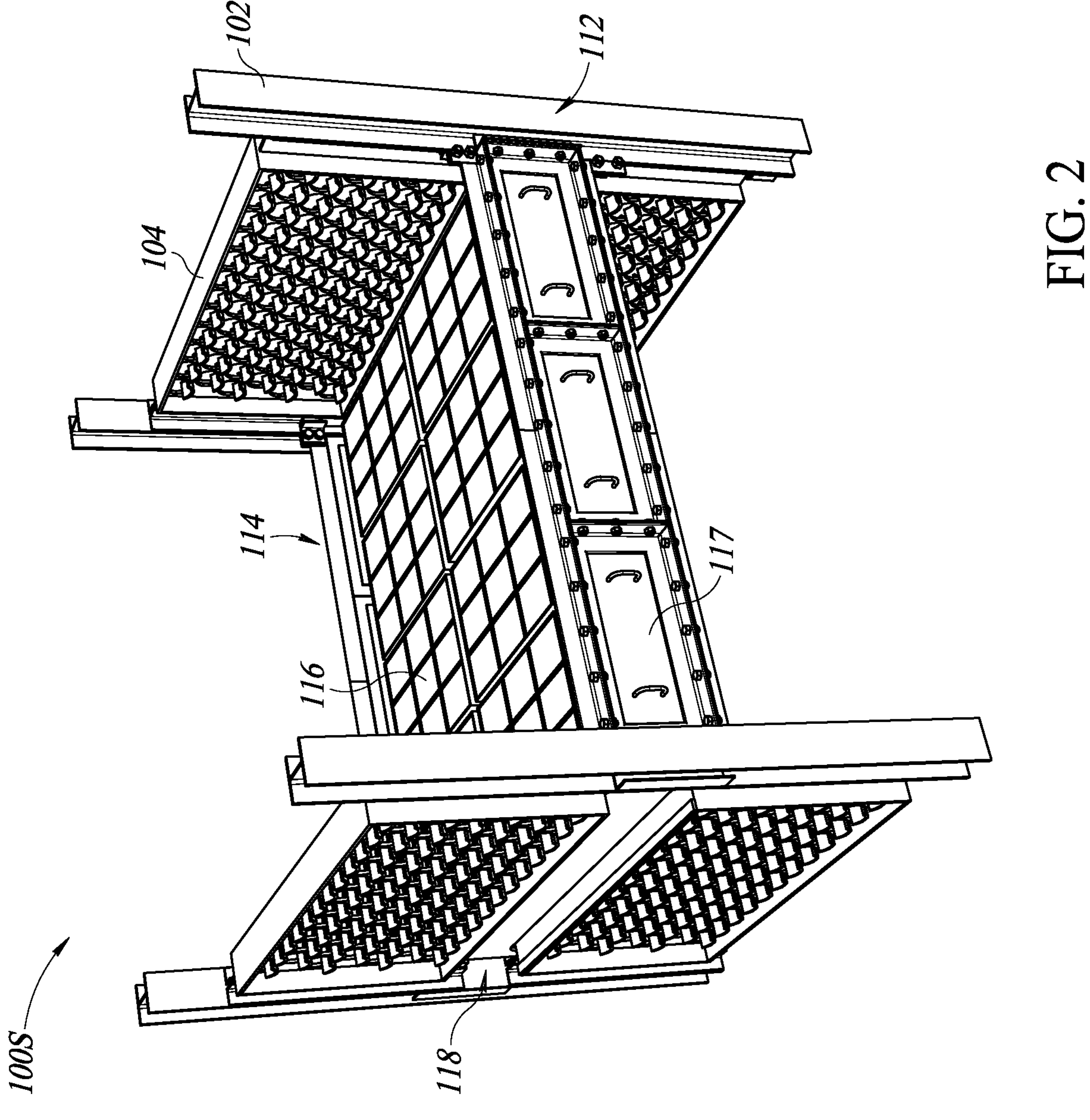
FIG. 2 is an isometric view of a subsection of the convection section of FIG. 1 showing a first catalyst support bed and a second catalyst support bed.
Figure 3:
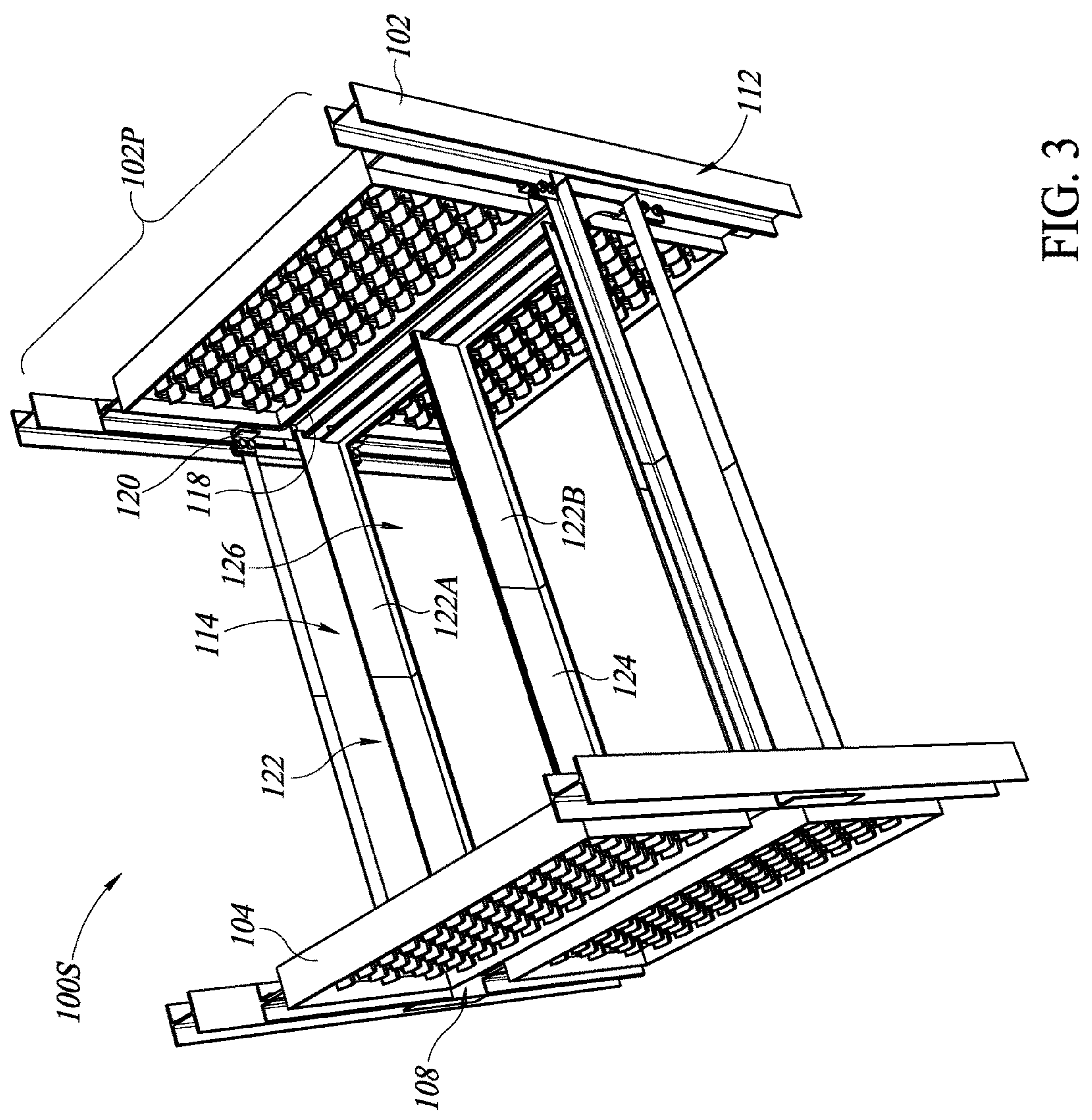
FIG. 3 is an isometric view of a structural frame of the subsection of FIG. 2.

FIG. 2 shows a representative subsection 100S of the convection section 100 in more detail and FIG. 3 shows the representative subsection 100S without catalyst modules. As noted above, each subsection 100S may be defined between successive pairs of columns 102 and tube sheets 104 in the convection section 100. Further, unless otherwise provided herein, each subsection 100S may have the same or similar features. With reference to FIG. 2 and FIG. 3, the subsection 100S includes a structural frame 114 coupled to the columns 102. The structural frame 114 is configured to support one or more catalyst modules 116. The catalyst modules 116 may have a size and a shape to be received in the gap or space 108 between the tubes 106 without interfering with the tubes 106 (FIG. 1). For example, a height of the modules 116 in the axial direction may be less than 460 mm in some embodiments. In an embodiment, it may be possible to re-arrange the heating surface (or tubes 106) above and/or below the structural frame 114 to allow installation of catalyst modules 116 greater than 460 mm in height in the gap 108. Or, in other words, the space or gap 108 may be greater than 460 mm by rearranging tubes around the gap 108. Increasing the available space and installing larger catalyst modules 116 will increase the residence time of effluent flow through the catalyst modules 116 and thus increase NOx reduction for compliance with NOx emission standards. In some embodiments, the gap or space 108 may therefore have a height in the axial direction greater than 460 mm, such as 500 mm, 600 mm, 700 mm, 800 mm, 900 mm, 1000 mm, or more.

In the non-limiting example illustrated in FIG. 2, there are eight catalyst modules 116 arranged side by side and received on the structural frame 114. Specifically, the catalyst modules 116 may be arranged in two rows of four catalyst modules 116 each in the longitudinal direction. Other configurations are possible and contemplated herein, such as three rows or more rows of catalyst modules 116, or a single row and one catalyst module 116 in the row in the simplest arrangement. The catalyst modules 116 can be loaded or unloaded through at least one lateral side 112 via removable access doors 117. The access doors 117 may include a single door, or several doors coupled together to allow selective access to portions of the catalyst modules 116, or to assist with manipulating the doors 117 during removal.

FIG. 3 shows the subsection 100S without the catalyst modules 116 to provide more detail regarding aspects of the structural frame 114. With continuing reference to FIG. 2, the structural frame 114 includes a plurality of beams 118 that are coupled to the plurality of columns 102. In an embodiment, the structural frame 114 may include one beam 118 coupled to a corresponding pair of columns 102P on each end of the subsection 100S with each beam 118 extending through the gap 108 in the lateral direction. In an embodiment, the beams 118 may be at least partially received in brackets 120 that are coupled to individual columns 102 and described in more detail below. One or more catalyst support beds 122 are removably coupled to the plurality of beams 118 and positioned in the gap 108. More specifically, the one or more catalyst support beds 122 are slidably received on the plurality of beams 118 to enable loading and unloading of the catalyst modules 116 through at least one lateral side 112 of the convection section 100.

In an embodiment, each subsection 100S of the convection section 100 includes two catalyst support beds 122A, 122B that are adjacent each other in the gap or space 108. The enclosed drawings illustrate two catalyst support beds in each subsection 100S as an illustrative and non-limiting example of the concepts of the disclosure. In some embodiments, each subsection 100S may include three or more catalyst support beds for a convection section that is wider in the lateral direction, or only one bed for a convection section that is narrower in the lateral direction. Each catalyst support bed 122 may receive one or more catalyst modules 116, such as one row of catalyst modules 116 arranged in the longitudinal direction and described with reference to FIG. 2 in a non-limiting example. As such, the catalyst modules 116 can be loaded and unloaded through front and/or rear lateral sides 112 on opposite sides of the convection section 100 via sliding the catalyst support beds 122A, 122B relative to the beams 118 positioned on opposite longitudinal ends of the catalyst support beds 122A, 122B. The catalyst support beds 122 may each include a plurality of struts 124 that extend between successive beams 118 to receive and support the catalyst modules 116 in the structural frame 114.

Figure 4A:
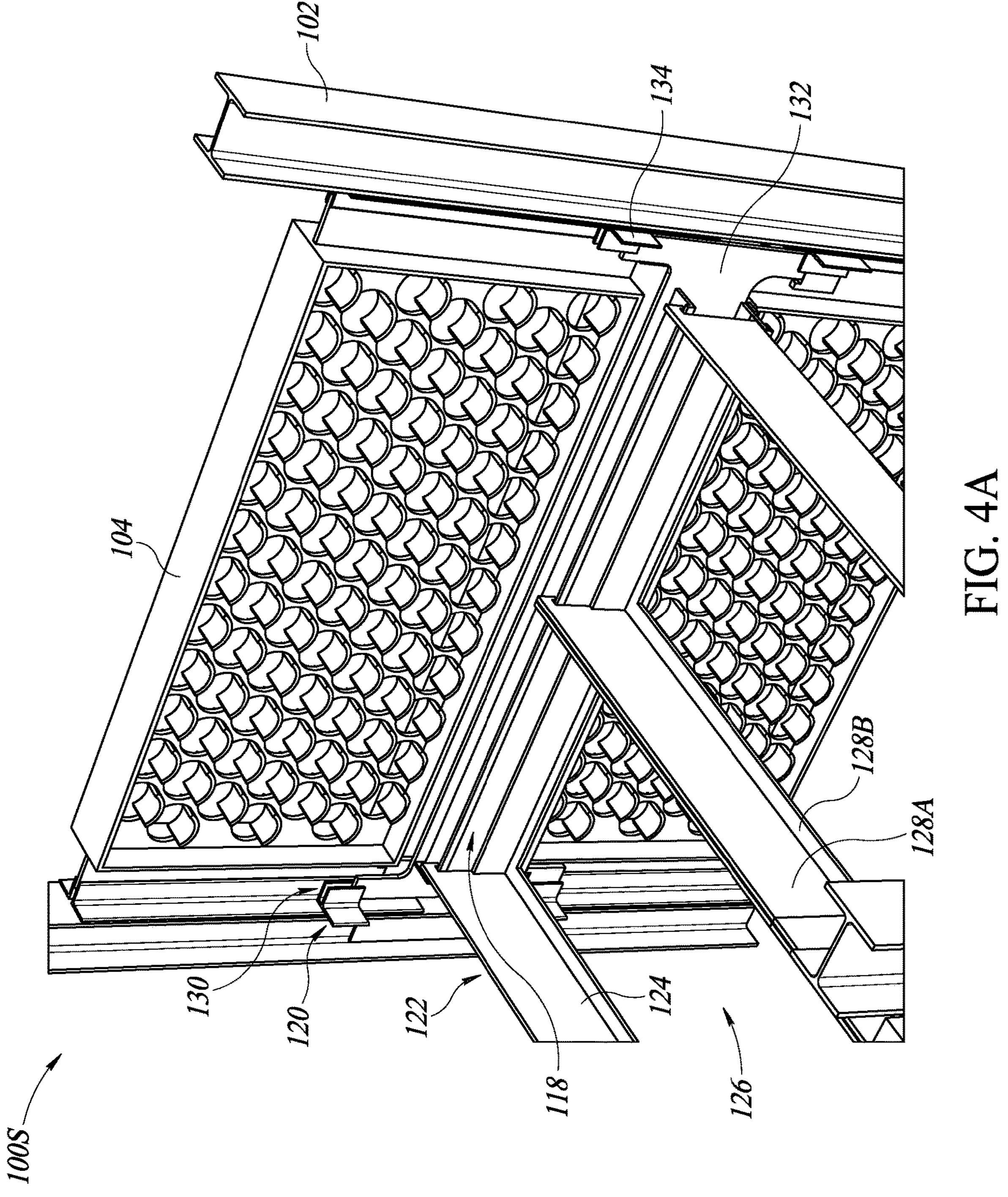
FIG. 4A and FIG. 4B are detail views of one end of the structural frame of FIG. 3 showing additional features of the structural frame.
Figure 4B:
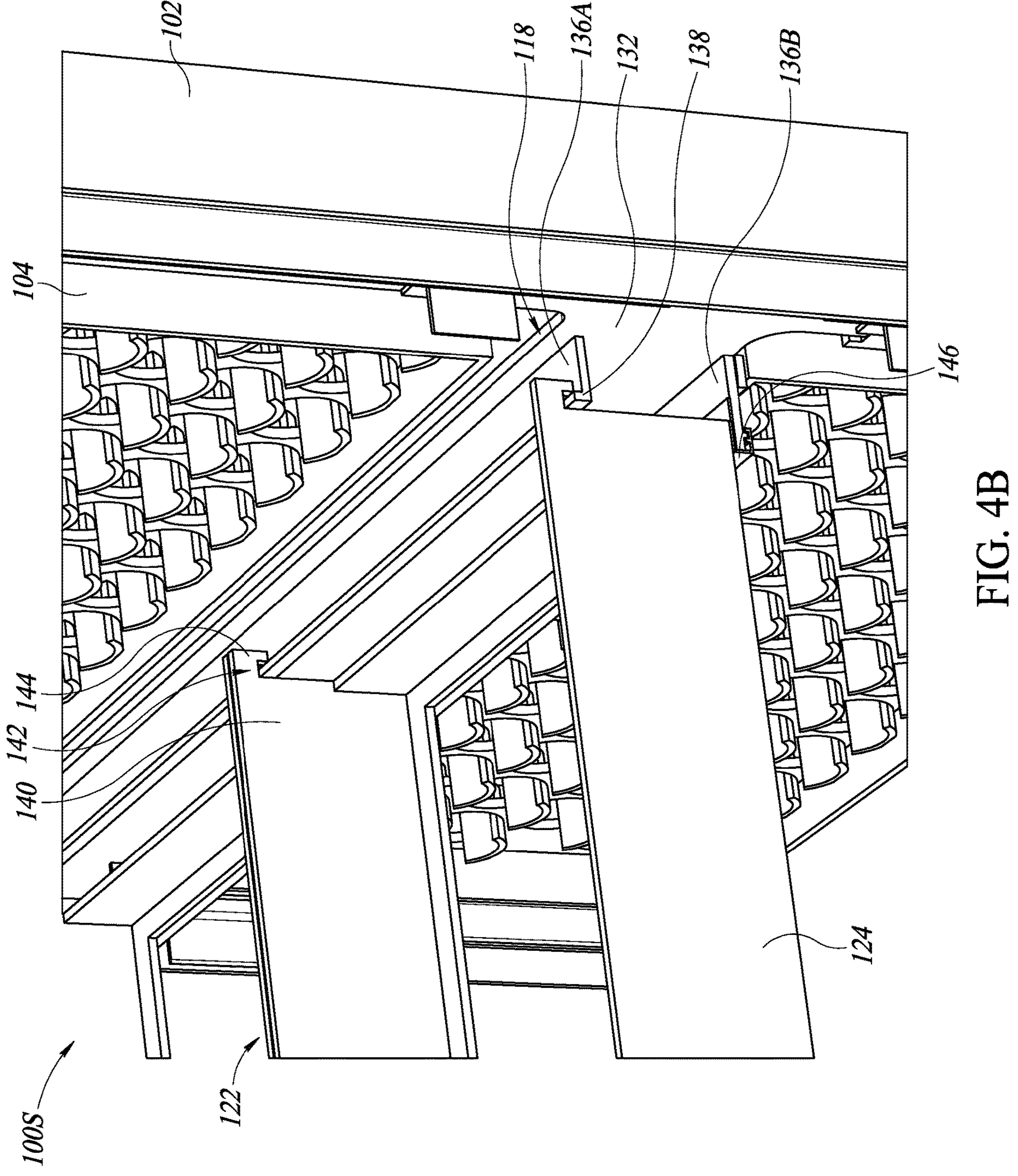

FIG. 4A and FIG. 4B are detail views of one longitudinal end of the subsection 100S. Beginning with FIG. 4A, each of the struts 124 of the one or more catalyst support beds 122 may include a generally flat and planar web or sidewall 128A extending in the longitudinal direction and a flange 128B extending perpendicular (i.e., in the lateral direction) from a bottom of the web 128A into the receiving space 126. The flange 128B may support a bottom surface of the catalyst modules 116 (FIG. 3), while also distributing a weight of the catalyst modules 116 to the webs 128A and throughout the structural frame 114 and the support system of the convection section 100. Further, FIG. 4A illustrates that where the subsection 100S includes two catalyst support beds 122, the struts 124 of each bed may be positioned adjacent to each other, or in some cases, in contact with each other along a longitudinal centerline through the subsection 100S. Such an arrangement of the struts 124 assist with providing a seal between the catalyst support beds 122 and other aspects of the subsection 100S to ensure that all flue gas flows through the catalyst modules 116.

FIG. 4A also provides additional detail regarding the brackets 120. The brackets 120 may be coupled directly to respective ones of the columns 102 and configured to receive at least a portion of a corresponding one of the plurality of beams 118. In an embodiment, there are two brackets 120 coupled to each column 102 above and below each beam 118. Each bracket 120 may include a channel 130 formed by spaced apart sidewalls of the bracket 120 that receives a portion of a web 132 of the beams 118, such as an extension of the web 132 of the beams 118 in the axial direction. The brackets 120 may generally have an "L shape" with the channel 130 formed in a first extension of the "L" and a second extension 134 of the "L" perpendicular to the first extension that is welded to the columns 102 to provide a flange extension that supports the sidewalls of the bracket 120 defining the channel 130. In an embodiment, the brackets 120 axially above the beam 118 are structured to axially align the beam 118 and to restrict any longitudinal displacement of the beam 118. However, the beam 118 may not be coupled to the brackets 120 axially above the beam 118, but rather, the beam 118 can freely slide inside the brackets 120 axially above the beam 118 (i.e., without restrictions in any direction) for thermal expansion during operation. The brackets 120 axially below the beam 118 are structured to provide load bearing support for the beam 118, as well as axially aligning the beam 118 and restricting longitudinal displacement. As a result, beam 118 can freely slide inside the upper brackets 120 in the longitudinal, lateral, and axial directions for thermal expansion during operation, but is restricted for downward axial displacement by the lower brackets 120, such that thermal expansion during operation occurs in an upward axial direction (i.e. vertically upwards).

Turning to FIG. 4B, the plurality of beams 118 include the web 132 generally extending in the axial direction through the gap 108 (FIG. 3), a first flange 136A, and a second flange 136B. Each of the flanges 136A, 136B may be normal to the web 118, meaning that the flanges 136A, 136B are perpendicular to the web 132 of the beams 118 and extend in the longitudinal direction. The first flange 136A may be an upper flange that includes a rail 138 extending normal or perpendicular to the first flange 136A in an upward direction away from the first flange 136A. The plurality of struts 124 of the catalyst support beds 122 may include longitudinal ends 140 that includes a channel 142 that interfaces with the rail 138 of the first flange 136A of the plurality of beams 118 to assist with guiding the catalyst support beds 122 with respect to the beams 118 and the columns 102 during a sliding operation and/or a loading or unloading operation. The rail 138 is received in the channel 142 of the ends 140 of the struts 124 with the channel 142 also defining a hook 144 at the ends 140 of the struts 124 that extends to an opposite side of the rail 138 of the first flange 136A facing the web 132 of the beam 118. Accordingly, the top of each of the struts 124 of the catalyst support beds 122 may be guided by the first flange 136A of the beams 118. In some embodiments, the rail 138 of the first flange 136A and the channel 142 of the ends 140 of the struts 124 restrict movement of the catalyst support beds 122 in the longitudinal direction, while also allowing for thermal expansion in at least one direction (i.e., longitudinal and/or axial directions) and assisting with aligning and sliding the catalyst support beds 122 relative to the beams 118. A bottom of the struts 124 may be disposed on a support bar 146 that interfaces with the second flange 136B of the beams 118, as described in more detail below.

Figure 5:
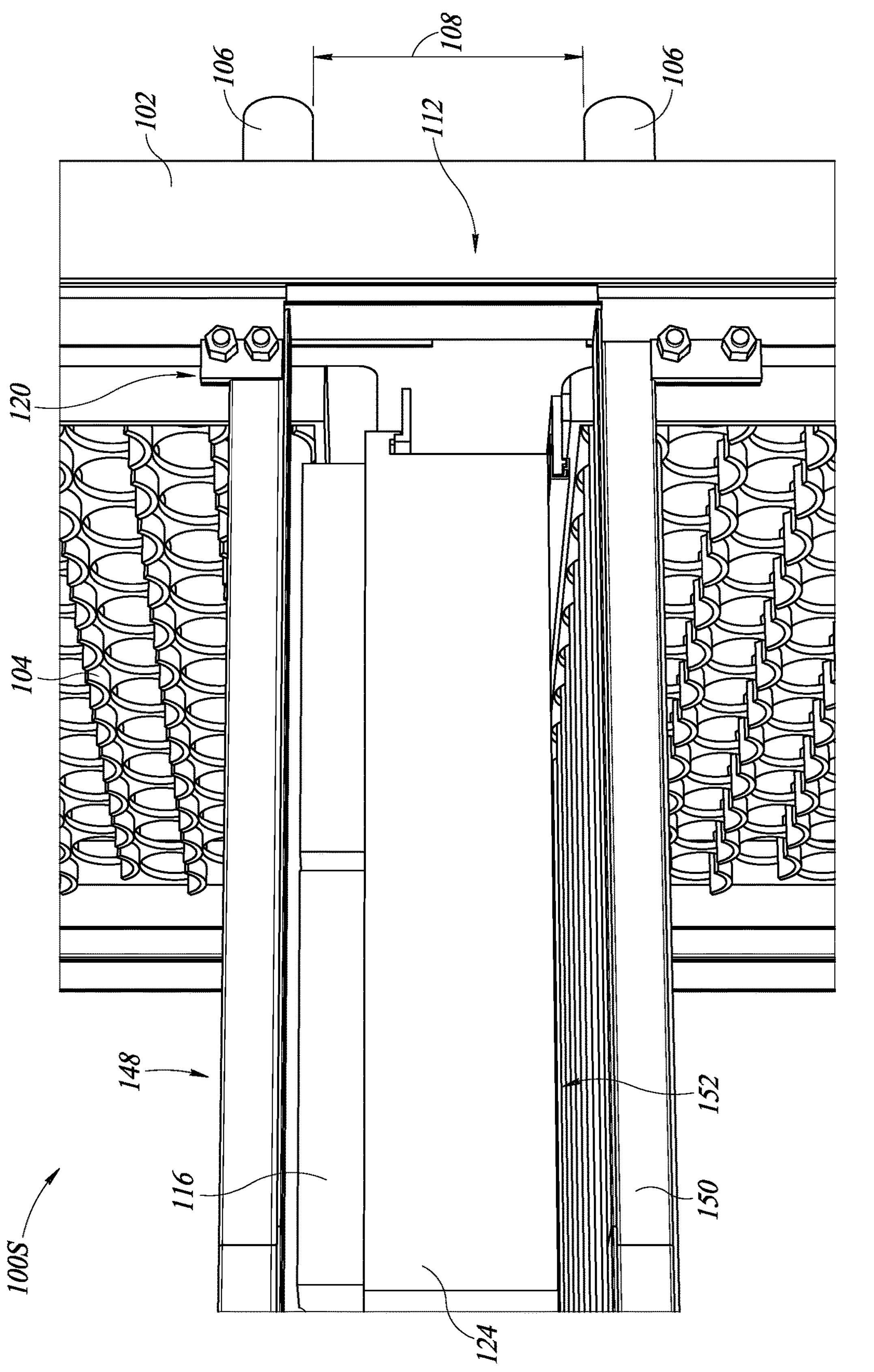
FIG. 5 is a detail view of a lateral side of the subsection of FIG. 2 showing a frame for a removable access door.

FIG. 5 shows one of the lateral sides 112 of the subsection 100S. In particular, FIG. 5 is provided to illustrate details of an access door frame 148. The access door frame 148 includes a plurality of frame elements 150 that extend in the longitudinal and axial directions at the lateral sides 112 of the subsection 100S (and the convection section 100 generally) to define an access opening 152 through which the catalyst modules 116 can be loaded or unloaded, or both, into the subsection 100S. The access doors 117 (FIG. 2) are removably coupled to the access door frame 148, and in some non-limiting examples, to each other, to selectively provide access to the catalyst modules 116 via removal of the doors 117, or to selectively cover and seal the access opening 150. Each of the frame elements 150 may be "L" shaped to provide flanges for receiving the doors 117 (FIG. 2) and securing the doors 117 to the frame elements 150 with fasteners. In an embodiment, the frame elements 150 are coupled to the plurality of columns 102 with fasteners. The access door frame 148 may also be welded to a convection module casing plate (not shown) that is coupled to the columns 102.

Figure 6:
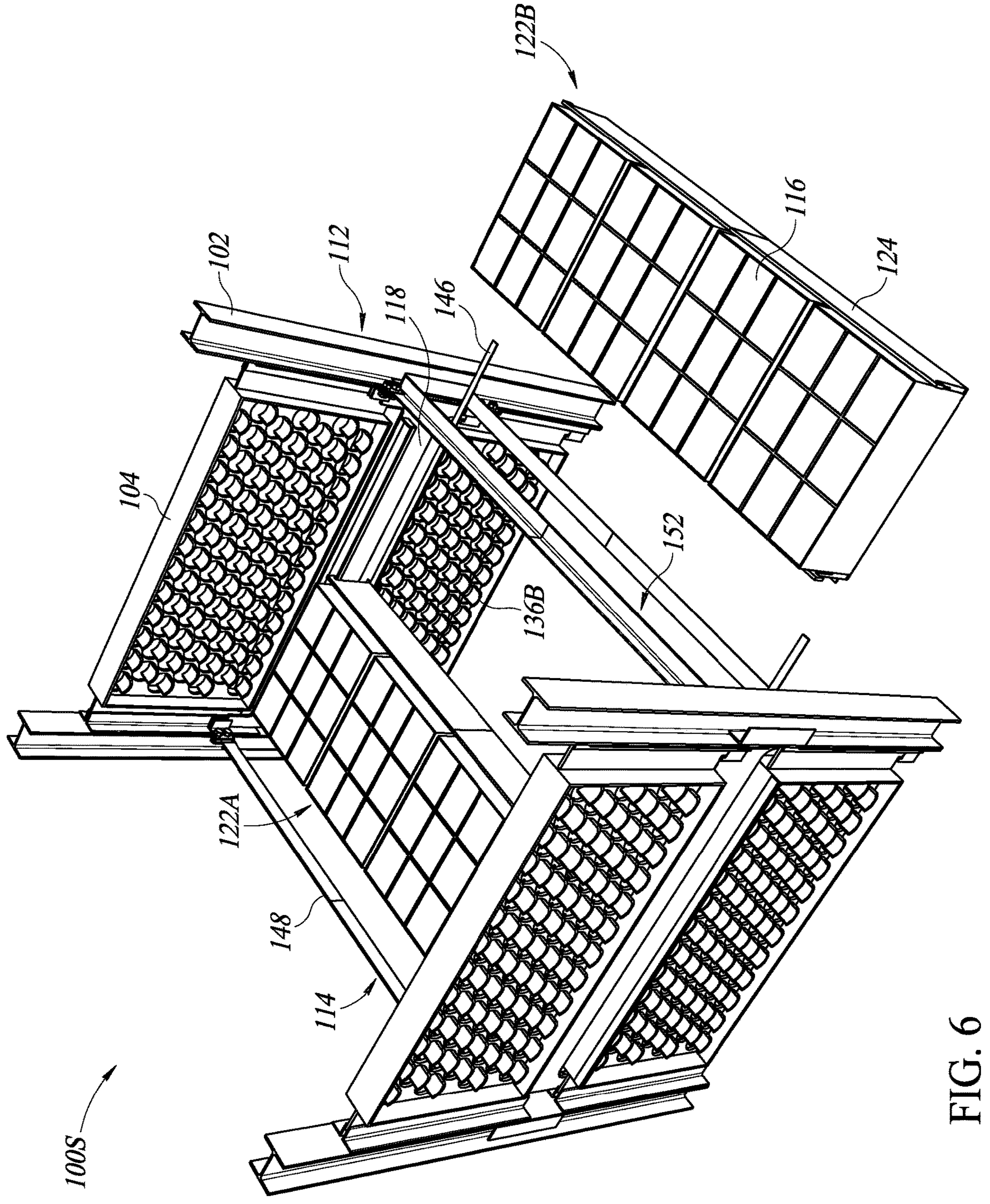
FIG. 6 is an isometric view of the subsection of FIG. 2 showing a sliding operation of the first catalyst support bed.

FIG. 6 shows a sliding operation of one of the catalyst support beds 122B. The support bar 146 may include multiple support bars 146, with at least one support bar 146 being associated with each beam 118. The support bars 146 are configured to slide on the second flange 136B of the beams 118, as illustrated conceptually in FIG. 6. In operation, the support bars 146 may be placed on the second flange 136B of the beams 118 first, with the catalyst support beds 122A, 122B initially supported at the bottom by the support bars 146. Then, the support bars 146 and the catalyst support beds 122A, 122B slide through the access opening 152 in the access door frame 148 in a corresponding lateral side 112 of the subsection 100S (or convection section 100). FIG. 6 further illustrates that the struts 124 supporting the catalyst modules 116 may not include struts across lateral end faces of the catalyst modules 116 in some embodiments, but rather, the modules 116 may be self-supported in position in the catalyst support beds 122A, 122B, or may be coupled to each other seals, or both.

Figure 7A:
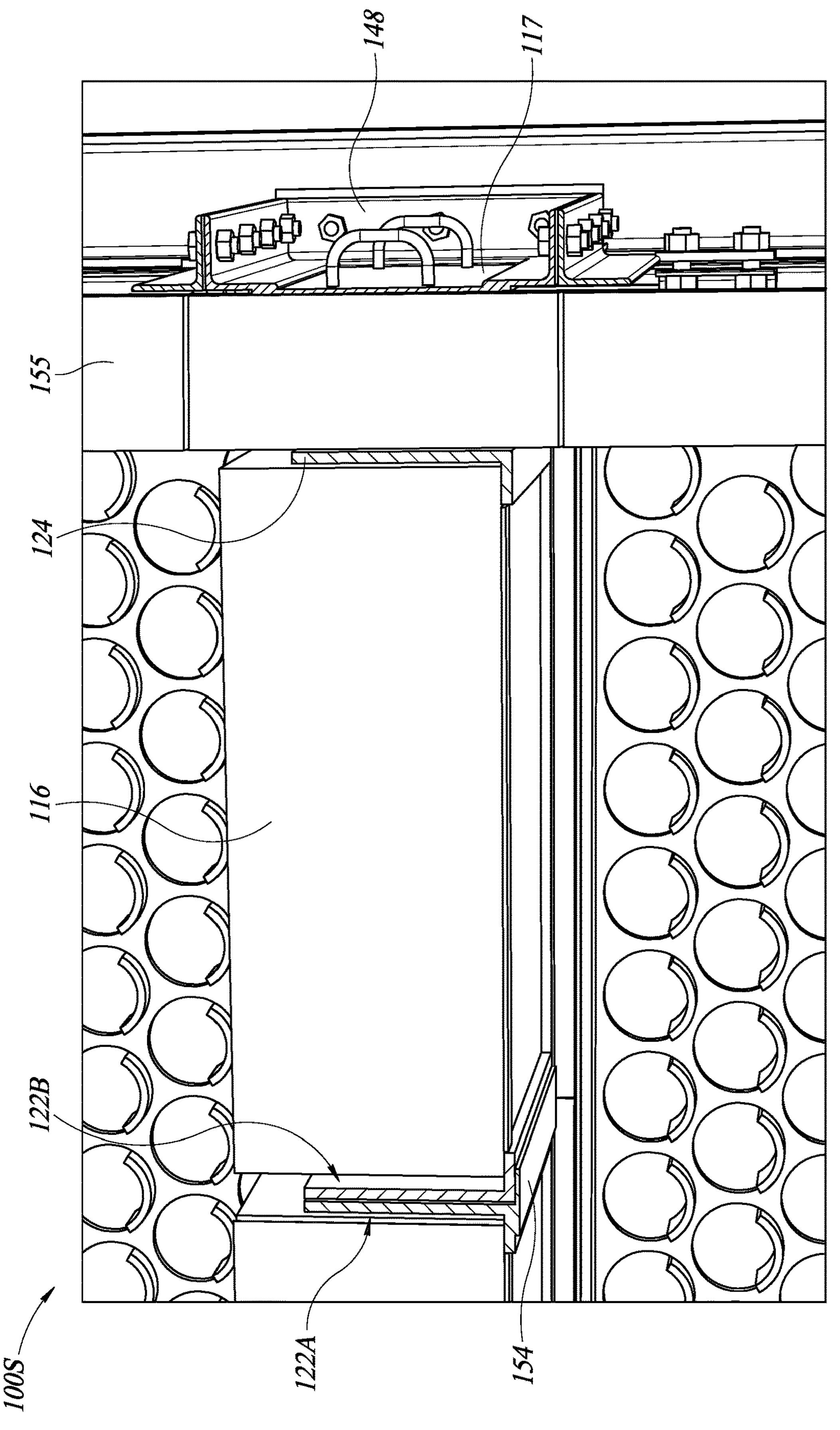
FIG. 7A and FIG. 7B are detail views of one end of the subsection of FIG. 2 showing seals or gaskets between the first catalyst support bed and the second catalyst support bed.
Figure 7B:
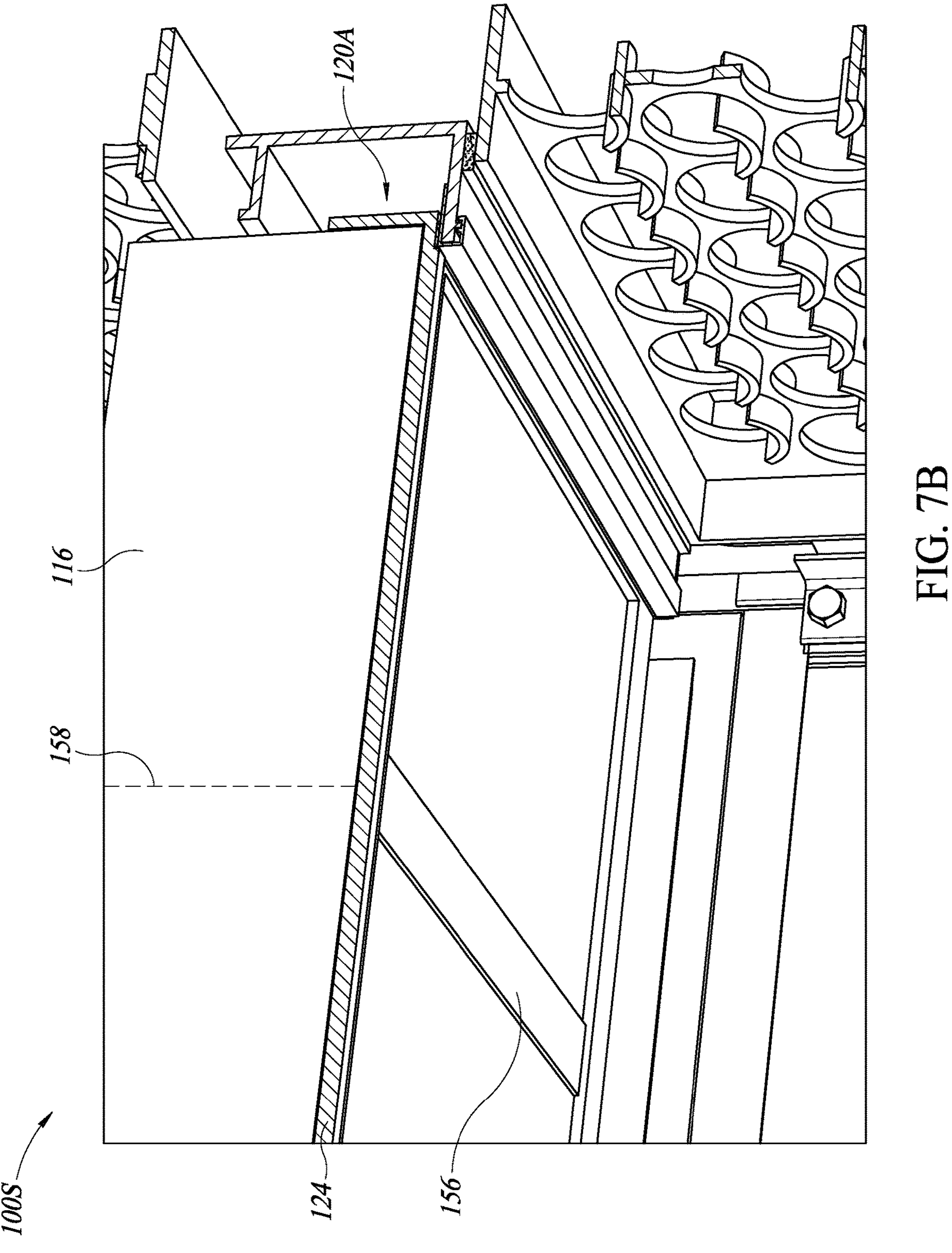

FIG. 7A and FIG. 7B are cross-sectional views of one end of the subsection 100S. Specifically, FIG. 7A is a cross-sectional view in the longitudinal direction and FIG. 7B is a cross-sectional view in the lateral direction. Beginning with FIG. 7A, the struts 124 of the one or more catalyst support beds 122 may be coupled together with a seal plate 154. The seal plate 154 may be provided in the form factor of a gasket or a metal plate with a gasket that is coupled a bottom of the struts 124 at an interface between the one or more catalyst support beds 120 to direct all effluent flow through the catalyst modules 116. Alternatively, the seal plate 154 may be part of one of the struts 124. For example, as shown in FIG. 7A, one of the struts 124 of the first catalyst support bed 122A may include a plate-like extension that overlaps a portion of a bottom of one of the struts 124 of the second catalyst support bed 122B in a self-sealing arrangement as the second catalyst support bed 122B is slid into contact with the first catalyst support bed 122A. A gasket may also be disposed on the plate-like extension and in contact with the bottom of the strut 124 of the catalyst second support bed 122B to further improve the seal.

In an embodiment, the subsection 100S of the convection section 100 further includes an insulation layer 155 that may be provided in a form factor of a plurality of insulation blocks that are in direct contact with end struts 124 of the catalyst support beds 122A, 122B, the access doors 117, and the access door frame 148. A wall insulation hot face of the insulation layer 155 may face inward toward the operational space of the subsection 100S. The insulation layer 155 may serve a dual purpose, namely to provide a seal around edges of the catalyst support beds 122A, 122B (i.e., fill a space between the support beds 122A, 122B, the access door frame 148, and the access doors 117), while also retaining heat inside of the subsection 100S. In an embodiment, the insulation layer 155 is attached to the access doors 117 such that, during operation, the doors 117 and the insulation layer 155 are removed together to provide access to the catalyst support beds 122A, 122B and the catalyst modules 116.

Turning to FIG. 7B, the catalyst support beds 122A, 122B may further include cross bars 156 extending laterally between the struts 124 and positioned underneath the catalyst modules 116 to further support the catalyst modules 116. Specifically, the cross bars 156 may be positioned at regular intervals across the catalyst support beds 122A, 122B that correspond to small spaces between the catalyst modules 116 in the catalyst support beds 122A, 122B to also provide a self-sealing function. In an embodiment, the cross bars are provided in a form factor of an interlocking seal plate 156 that engages catalyst modules 116 on either side of a space between the modules 116 (the space is represented in FIG. 7B by dashed line 158). The cross bar 156 or interlocking seal plate 156 further assists with ensuring that all effluent flow passes through the catalyst modules 116.

In addition to other components described herein, such as the seal plate 154 and cross bar 156, which assist in ensuring that effluent flow passes through the catalyst modules 116, the subsection 100S may include other sealing material(s), such as pumpable refractory material and/or ceramic fiber material, to seal gaps, such as between adjacent SCR modules and/or adjacent catalyst support beds 122A, 122B, to further assist in ensuring that effluent or flue gas passes through the catalyst modules 116, rather than bypassing them. As one specific example, such materials may be used to fill a gap between adjacent SCR modules, such as between column 102A and 102B and between upper and lower tube sheets 104.

Figure 8:
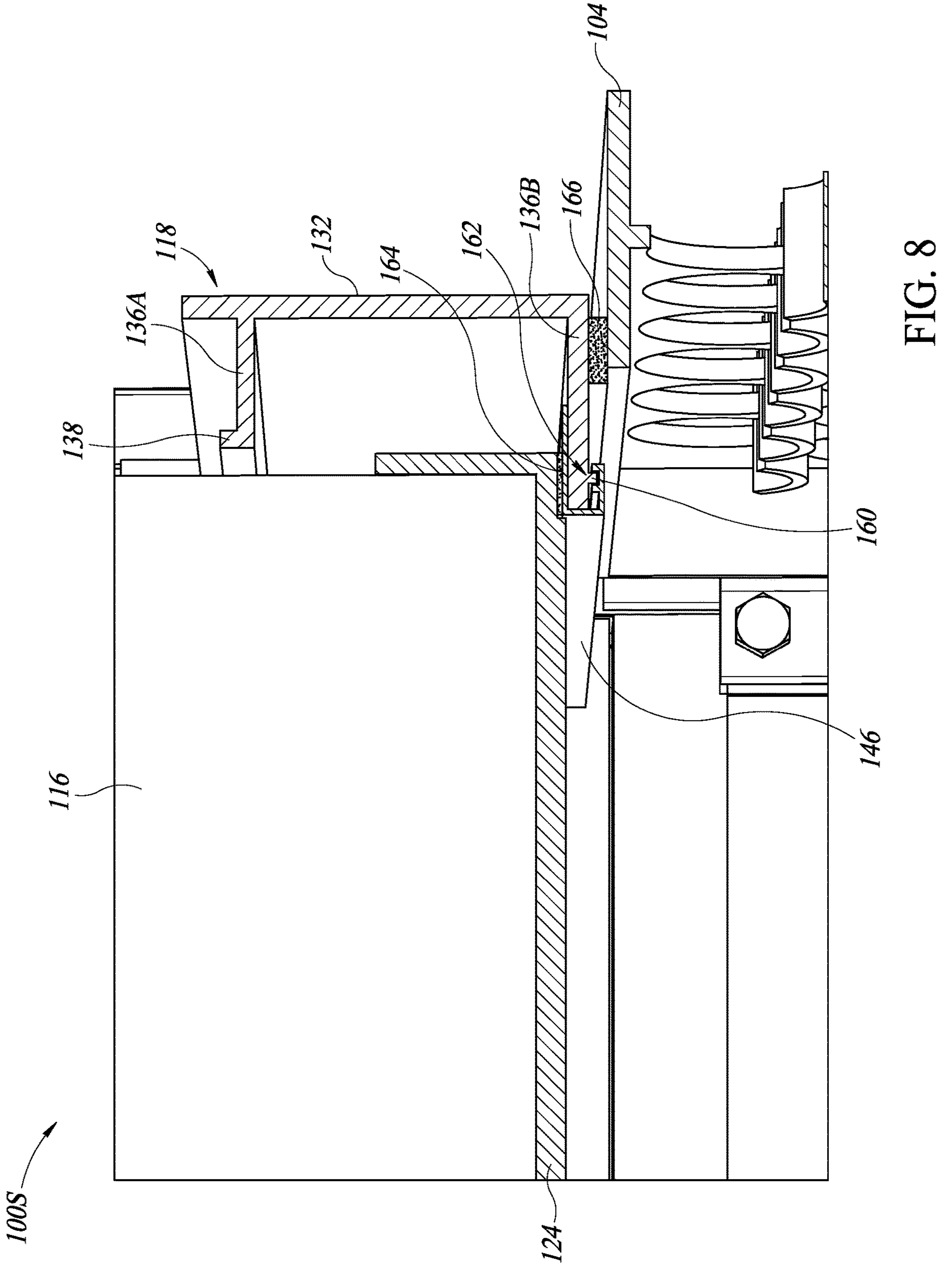
FIG. 8 is a detail view of one end of the subsection of FIG. 2 showing seals or gaskets between the structural frame and the convection section.

FIG. 8 is a cross-sectional view of one end of the subsection 100S in the lateral direction with a different viewpoint and orientation from FIG. 7B. FIG. 8 provides more details regarding the beam 118, as well as additional features of the subsection 100S generally. For example, FIG. 8 shows the first flange 136A and the rail 138 on the first flange 136A of the beam 118 in more detail. The beam 118 further includes the second flange 136B with the second flange 136B including a guide element 160 extending normal or perpendicular to the second flange 136B, and in a direction opposite to the rail 138 of the first flange 136A. The support bar 146 includes a slot 162 that interfaces with the guide element 160 on the second flange 136B of the beam 118. The guide element 160 and slot 162 may function similarly to the rail 138 of the first flange 136A and the channel 142 of the struts 124 described above. More specifically, the slot 162 of the support bar 146 receives and interfaces with the guide element 160 on the second flange 136B of the beam 118 to assist with sliding and/or guiding the support bar 146 and catalyst support beds 122 (FIG. 4A and FIG. 6) relative to the beams 118. The support bar 146 may not be intended to restrict longitudinal displacement of the catalyst support beds 122, but rather, allows for thermal expansion in the longitudinal direction during operation. The support bar 146 allows for installation of the catalyst support beds 122 on top of the second flange 136B of the beam 118, while also carrying a first gasket 164 to improve sealing and supporting the load of the catalyst support beds 122 and catalyst modules 116, and distributing the load to second flange 136B.

The subsection 100S further includes a first gasket 164 between the support bar 146 and the struts 124 of the one or more catalyst support beds 122 as well as a second gasket 166 between the second flange 136B of the beams 118 and a top of the tube sheets 104 below the beams 118. In an embodiment, the second gasket 166 is configured to compress in response to expansion of the tube sheets 104 under an operational temperature of the convection section 100 to further improve the seal. Thus, the gaskets 164, 166 also assist with directing effluent flow through the catalyst modules 116.

As a result, the concepts of the disclosure enable catalyst support structures that are an integral part of the convection section of a fired heater, instead of utilizing a separate and distinct structure for SCR of NOx with catalyst modules as in known SCR systems, to reduce plot space and equipment count. Further, the catalyst support grids structures are designed with catalyst modules installed in the cavities instead of being located above the supporting structure as in known systems. The concepts of the disclosure also enable self-sealing of the catalyst support structures and installed catalyst modules to eliminate sealing tape that is commonly used when catalyst modules are placed on top of support structures. Moreover, the concepts of the disclosure enable loading and unloading of SCR catalyst modules on lateral sides of the convection section along the entire convection length to achieve target NOx reduction as opposed to loading or unloading of the catalyst modules through ends of the convection section as in prior practice. Such benefits can be achieved with new installations, but are particularly advantageous for retrofitting existing heaters where SCR was not originally considered in the design. The comparatively small space occupied by the structural frame and the catalyst modules (i.e., less than 460 mm) enables the technology discussed herein to be applied to a wide range of existing equipment. Moreover, the utilization of an existing support system of a heater significantly reduces downtime and cost associated with retrofitting a heater to include SCR technology for reduction of NOx emissions.

The concepts of the disclosure may be particularly useful and advantageous in combination with the devices, systems, and methods described in U.S. Provisional Patent Application No. 63/269,754 filed on Mar. 22, 2022 in the U.S. Patent and Trademark Office, the entire contents of which are incorporated herein by reference. Further, the concepts of the disclosure may be advantageous for use with any technology for reducing carbon dioxide emissions, which can increase NOx emissions as a result. Thus, adding or retrofitting technology for the reduction of carbon dioxide with the SCR technology discussed herein may enable reduction in both carbon dioxide and NOx emissions in a single design.

The above physical embodiments can also be provided or practiced as one or more steps of a method for reducing NOx emissions. For example, a method may include building a new heater or retrofitting an existing heater by placing a structural frame in a space between tube sheets, and sliding catalyst support beds carrying catalyst modules into the structural frame, among other steps. Thus, the methods of practicing the invention are included in the scope of the disclosure. While the description herein applies to technologies for reducing NOx emissions, it may also be applied to other technologies, systems, and or methods, such as those used for CO reduction. In any of these embodiments, a catalyst can be provided in modules, pellets, and/or baskets.

In the above description, certain specific details are set forth in order to provide a thorough understanding of various embodiments of the disclosure. However, one skilled in the art will understand that the disclosure may be practiced without these specific details. In other instances, well-known structures associated with the technology have not been described in detail to avoid unnecessarily obscuring the descriptions of the embodiments of the present disclosure.

Certain words and phrases used in the specification are set forth as follows. As used throughout this document, including the claims, the singular form "a", "an", and "the" include plural references unless indicated otherwise. Any of the features and elements described herein may be singular, e.g., a shell may refer to one shell. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

The use of ordinals such as first, second, third, etc., does not necessarily imply a ranked sense of order, but rather may only distinguish between multiple instances of an act or a similar structure or material.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other derivatives thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise.

Generally, unless otherwise indicated, the materials for making the invention and/or its components may be selected from appropriate materials such as composite materials, ceramics, plastics, metal, polymers, thermoplastics, elastomers, plastic compounds, catalysts and ammonia compounds, and the like, either alone or in any combination.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The terms "top," "bottom," "upper," "lower," "up," "down," "above," "below," "left," "right," and other like derivatives take their common meaning as directions or positional indicators, such as, for example, gravity pulls objects down and left refers to a direction that is to the west when facing north in a Cardinal direction scheme. These terms are not limiting with respect to the possible orientations explicitly disclosed, implicitly disclosed, or inherently disclosed in the present disclosure and unless the context clearly dictates otherwise, any of the aspects of the embodiments of the disclosure can be arranged in any orientation.

As used herein, the term "substantially" is construed to include an ordinary error range or manufacturing tolerance due to slight differences and variations in manufacturing. Unless the context clearly dictates otherwise, relative terms such as "approximately," "substantially," and other derivatives, when used to describe a value, amount, quantity, or dimension, generally refer to a value, amount, quantity, or dimension that is within plus or minus 5% of the stated value, amount, quantity, or dimension. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Patent Application No. 63/404,883, filed Sep. 8, 2022, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A heater, comprising:

a convection section, including:

a plurality of columns arranged in pairs of columns spaced from each other along a longitudinal direction of the convection section, and the pairs of columns including a first column and a second column spaced from each other in a lateral direction of the convection section;

a plurality of tube sheets coupled to the plurality of columns, including pairs of tube sheets coupled to corresponding pairs of columns, the pairs of tube sheets each including a first tube sheet and a second tube sheet;

a plurality of tube bundles coupled to the plurality of tube sheets;

a gap between the first tube sheet and the second tube sheet in each pair of tube sheets; and a structural frame in the gap, including:

a plurality of beams coupled to corresponding pairs of columns of the plurality of columns and extending through the gap; and a first catalyst support bed removably coupled to the plurality of beams and positioned in the gap, the first catalyst support bed being slidable with respect to the plurality of beams to enable loading or unloading of a catalyst into the convection section through at least one lateral side of the convection section.

2. The heater of claim 1, wherein a first one of the plurality of beams includes a first flange with a rail and a second flange with a guide element.

3. The heater of claim 2, wherein the first flange and the second flange are each normal to a web of the first one of the plurality of beams.

4. The heater of claim 3, wherein the rail is normal to the first flange and extends from the first flange in a first direction, and the guide element is normal to the second flange and extends from the second flange in a second direction opposite to the first direction.

5. The heater of claim 2, wherein the first catalyst support bed includes a plurality of struts coupled together, first ones of the plurality of struts including a channel interfacing with the rail of the first flange of the first one of the plurality of beams to assist with sliding of the first catalyst support bed relative to the plurality of beams.

6. The heater of claim 5, wherein the structural frame further includes a support bar disposed on the second flange of the first one of the plurality of beams and including a slot configured to interface with the guide element of the second flange of the first one of the plurality of beams to assist with sliding of the first catalyst support bed relative to the plurality of beams.

7. The heater of claim 6, wherein the support bar is configured to prevent movement of the first catalyst support bed in the longitudinal direction of the convection section.

8. The heater of claim 5, wherein the convection section further includes a first gasket between the support bar and at least one of the plurality of struts of the first catalyst support bed, and a second gasket between the second flange of the first one of the plurality of beams and at least a first one of the plurality of tube sheets.

9. The heater of claim 8, wherein the second gasket is configured to compress in response to expansion of the at least the corresponding one of the plurality of tube sheets under an operational temperature of the convection section.

10. The heater of claim 1, wherein the structural frame includes the first catalyst support bed being slidable to enable loading or unloading of the catalyst into the convection section through a first lateral side of the convection section, the heater further comprising:

a second catalyst support bed positioned in the gap and configured to enable loading or unloading of the catalyst into the convection section through a second lateral side of the convection section opposite to the first lateral side.

11. The heater of claim 10, wherein each of the plurality of beams include a first flange with a rail and a second flange with a guide element, and the second catalyst support bed includes a plurality of struts coupled together, first ones of the plurality of struts including a channel interfacing with the rail of the first flange of corresponding ones of the plurality of beams to assist with sliding of the second catalyst support bed relative to the plurality of beams.

12. The heater of claim 11, further comprising:

a support bar disposed on the second flange of the corresponding ones of the plurality of beams and including a slot configured to interface with the guide element of the second flange of the corresponding ones of the plurality of beams to assist with sliding of the second catalyst support bed.

13. The heater of claim 1, further comprising:

an interlocking seal plate between modules of the catalyst on the first catalyst support bed.

14. The heater of claim 1, wherein the gap between the first tube sheet and the second tube sheet is less than 460 mm, and the structural frame has a height less than 460 mm.

15. The heater of claim 1, wherein the structural frame further includes:

a plurality of frame elements coupled to the plurality of columns at the at least one lateral side of the convection section; and a removable access door coupled to the plurality of frame elements.

16. The heater of claim 15, further comprising:

an insulation layer between an end face of the first catalyst support bed and an internal face of the removable access door.

17. The heater of claim 15, wherein the structural frame further includes a plurality of brackets coupled to the plurality of columns, each of the plurality of brackets having a channel that receives at least a portion of a corresponding one of the plurality of beams to assist in coupling the plurality of beams to the plurality of columns.

18. The heater of claim 17, wherein the plurality of brackets are coupled to the plurality of frame elements to assist in coupling the plurality of frame elements to the plurality of columns.

19. A heater, comprising:

a convection section including a plurality of subsections arranged in parallel over an entire longitudinal length of the convection section with the plurality of subsections separated from each other by supports of the convection section, each subsection of the plurality of subsections including a respective at least one lateral side corresponding to at least one lateral side of the convection section;

a plurality of tubes coupled to the supports of the convection section;

a gap between outer tubes of the plurality of tubes; and a plurality of SCR modules positioned in the gap and each configured to carry one or more catalyst modules, the plurality of SCR modules associated with respective ones of the plurality of subsections of the convection section and configured to be installed in parallel through the respective at least one lateral side of the plurality of subsections.

20. The heater of claim 19, wherein each subsection of the plurality of subsections includes a single SCR module of the plurality of SCR modules being slidable with respect to the convection section.

21. The heater of claim 19, wherein each subsection of the plurality of subsections includes at least two SCR modules of the plurality of SCR modules with each SCR module of the at least two SCR modules being slidable with respect to the convection section.

22. The heater of claim 21, wherein the at least two SCR modules are slidable with respect to a front lateral side and a rear lateral side of each respective subsection of the plurality of subsections.

* * * * *